United States Patent
Bensberg et al.

(10) Patent No.: US 12,399,882 B1
(45) Date of Patent: Aug. 26, 2025

(54) DATA AGGREGATION BASED ON HASH MAP DATA STRUCTURES

(71) Applicant: SAP SE, Walldorf (DE)

(72) Inventors: Christian Bensberg, Heidelberg (DE); Kai Stammerjohann, Wiesloch (DE); Frederik Transier, Bammental (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/663,474

(22) Filed: May 14, 2024

(51) Int. Cl.
| G06F 16/00 | (2019.01) |
| G06F 11/34 | (2006.01) |
| G06F 16/22 | (2019.01) |
| G06F 16/2453 | (2019.01) |
| G06F 16/2455 | (2019.01) |

(52) U.S. Cl.
CPC ...... *G06F 16/2255* (2019.01); *G06F 11/3409* (2013.01); *G06F 16/24532* (2019.01); *G06F 16/24556* (2019.01)

(58) Field of Classification Search
None
See application file for complete search history.

(56) References Cited

U.S. PATENT DOCUMENTS

2009/0271412 A1* 10/2009 Lacapra ............... G06F 16/178
2012/0011108 A1* 1/2012 Bensberg ............ G06F 16/2255
707/E17.017

* cited by examiner

*Primary Examiner* — Tuankhanh D Phan
(74) *Attorney, Agent, or Firm* — Sterne, Kessler, Goldstein & Fox P.L.L.C.

(57) ABSTRACT

Disclosed herein are system, method, and computer program product embodiments for providing data aggregation based on hash map data structures. An embodiment operates by receiving a query specifying an input table and an aggregate function. The embodiment then generates a first thread-local hash map and a second thread-local hash map for the input table and performs a probing function associated with the first thread-local hash map. The embodiment then determines, based on the first thread-local hash map, an index cardinality associated with the input table. The embodiment then, in response to the determination that the index cardinality exceeds the threshold, performs a duplicate function associated with the second thread-local hash map and generates a second thread-local copy map. The embodiment then merges the first thread-local hash map and the second thread-local copy map, thereby generating a merged hash map.

18 Claims, 7 Drawing Sheets

DATA AGGREGATION BASED ON HASH MAP DATA STRUCTURES

BACKGROUND

A database typically stores large amounts of data in the form of database tables. Client applications access this data by transmitting queries (e.g., an aggregate function) to the database. For example, a database receives a query from a client application, generates a query execution plan, executes the query execution plan upon its database tables, and returns a result set to the client application.

In a database system, data structures such as hash maps can be used. When inserting data into a data structure (e.g., a hash map) corresponding to a first portion of data, a second portion of the memory may need to be allocated when the data structure grows in size. Parallel threads can be executed in different portions of the database system. When performing the aggregate function, one or more probing function such as linear probing, may be performed associated with the hash maps. More memory space may be allocated when performing the probing function. Typically, hash maps are used to find values with the same grouping (GROUP BY clause in SQL). Hash maps are beneficial for this task, even though they consume extra memory while processing the request. However, for database table with a high-cardinality (i.e., many distinct values), the one or more probing function may be performed with little benefit as this process hardly reduces the number of elements. Then, the efficiency of memory space usage may be decreased. Thus, performance of multiple-core computing systems can be seriously limited.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing data aggregation based on hash map data structures.

As described above, when performing the aggregate function, one or more probing function such as linear probing, may be performed associated with the hash maps. More memory space may be allocated when performing the probing function. However, for database table with a high-cardinality, the one or more probing function may be performed with little benefit. Then, the efficiency of memory space usage may be decreased. Thus, performance of multiple-core computing systems can be seriously limited.

Therefore, a technological solution is needed to provide an efficient data aggregation based on hash map data structures. The technological solution in the present disclosure can perform a duplicate function associated with hash map data structures instead of a probing function for database table with a high-cardinality, to improve the efficiency by avoiding unnecessary computation and memory allocations. In addition, instead of performing a probing function when merging a first and a second hash map data structures, a plurality of pointers can be stored in the merged hash map to further improve the efficiency of memory allocation. The plurality of pointers can be associated with entries of the first thread-local hash map and the second thread-local hash map.

Figure 1:
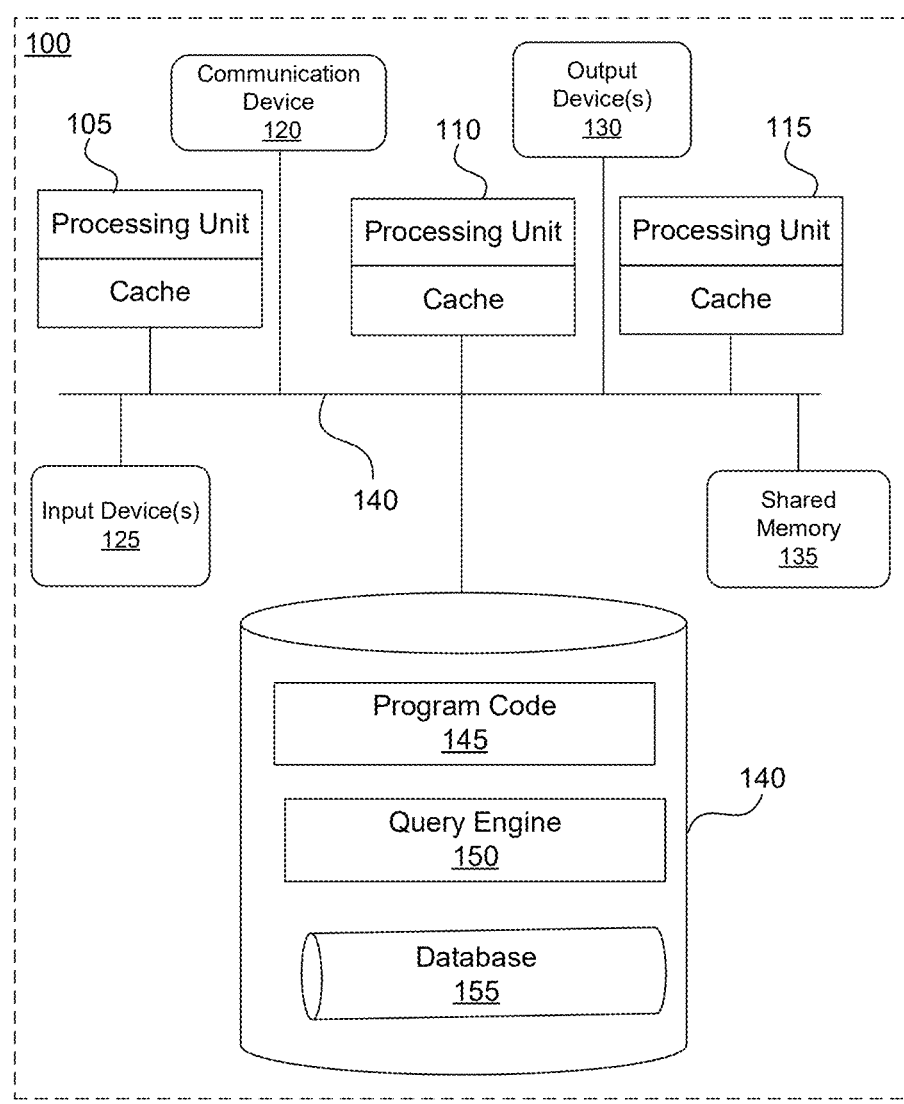
FIG. 1 illustrates an example system implementing mechanisms for providing data aggregation based on hash map data structures, according to some embodiments of the disclosure.

FIG. 1 illustrates an example system 100 implementing mechanisms for providing data aggregation based on hash map data structures, according to some embodiments of the disclosure. The example system 100 is provided for the purpose of illustration only and does not limit the disclosed embodiments.

In an effort to more fully and efficiently use the resources of a particular computing environment, a data structure and techniques of using that data structure may be developed to fully capitalize on the design characteristics and capabilities of that particular computing environment. In some embodiments herein, a data structure and techniques for using that data structure (i.e., algorithms) are provided for efficiently using the data structure disclosed herein in a parallel computing environment with shared memory. As used herein, the term parallel computation environment with shared memory refers to a system or device having more than one processing unit. The multiple processing units may be processors, processor cores, multi-core processors, etc. All of the processing units can access a main memory (i.e., a shared memory architecture). All of the processing units can run or execute the same program(s). As used herein, a running program may be referred to as a thread. Memory may be organized in a hierarchy of multiple levels, where faster but smaller memory units are located closer to the processing units. The smaller and faster memory units located nearer the processing units as compared to the main memory are referred to as cache.

System 100 may be, for example, associated with any of the devices described herein and may include a plurality of processing units 105, 110, and 115. The processing units may comprise one or more commercially available Central Processing Units (CPUs) in form of one-chip microprocessors or a multi-core processor, coupled to a communication device 120 configured to communicate via a communication network (not shown in FIG. 1) to an end client (not shown in FIG. 1). System 100 may also include a local cache memory associated with each of the processing units 105, 110, and 115 such as RAM memory modules. Communication device 120 may be used to communicate, for example, with one or more client devices or business service providers. System 100 further includes an input device 125 (e.g., a mouse and/or keyboard to enter content) and an output device 130 (e.g., a computer monitor to display a user interface element).

Processing units 105, 110, and 115 communicates with a shared memory 135 via a system bus 175. System bus 175 also provides a mechanism for the processing units to communicate with a storage device 140. Storage device 140 may include any appropriate information storage device, including combinations of magnetic storage devices (e.g., a hard disk drive), optical storage devices, and/or semiconductor memory devices for storing data and programs.

Storage device 140 stores a program 145 for controlling the processing units 105, 110, and 115 and query engine 150 for executing queries. Processing units 105, 110, and 115 may perform instructions of the program 145 and thereby operate in accordance with any of the embodiments described herein. For example, the processing units may concurrently execute a plurality of execution threads to build the index hash table data structures disclosed herein. Furthermore, query engine 150 may operate to execute a parallel join operation in accordance with aspects herein in cooperation with the processing units and by accessing database 155. Program 145 and other instructions may be stored in a compressed, uncompiled and/or encrypted format. Program 145 may also include other program elements, such as an operating system, a database management system, and/or device drivers used by the processing units 105, 110, and 115 to interface with peripheral devices.

In some embodiments, storage device 140 includes a database 155 to facilitate the execution of queries based on input table data. The database may include relational data tables, data structures (e.g., index hash tables), rules, and conditions for executing a query in a parallel computation environment such as that of FIGS. 1 and 2.

In some embodiments, the data structure(s) disclosed herein as being developed for use in parallel computing environments with shared memory is referred to as a parallel hash table. In some instances, the parallel hash table may also be referred to as a parallel hash map. In general, a hash table may be provided and used as index structures for data storage to enable fast data retrieval. The parallel hash table disclosed herein may be used in a parallel computation environment where multiple concurrently executing (i.e., running) threads insert and retrieve data in tables. Furthermore, an algorithm that uses the parallel hash tables herein is provided for data aggregation in a parallel computation environment.

Figure 2:
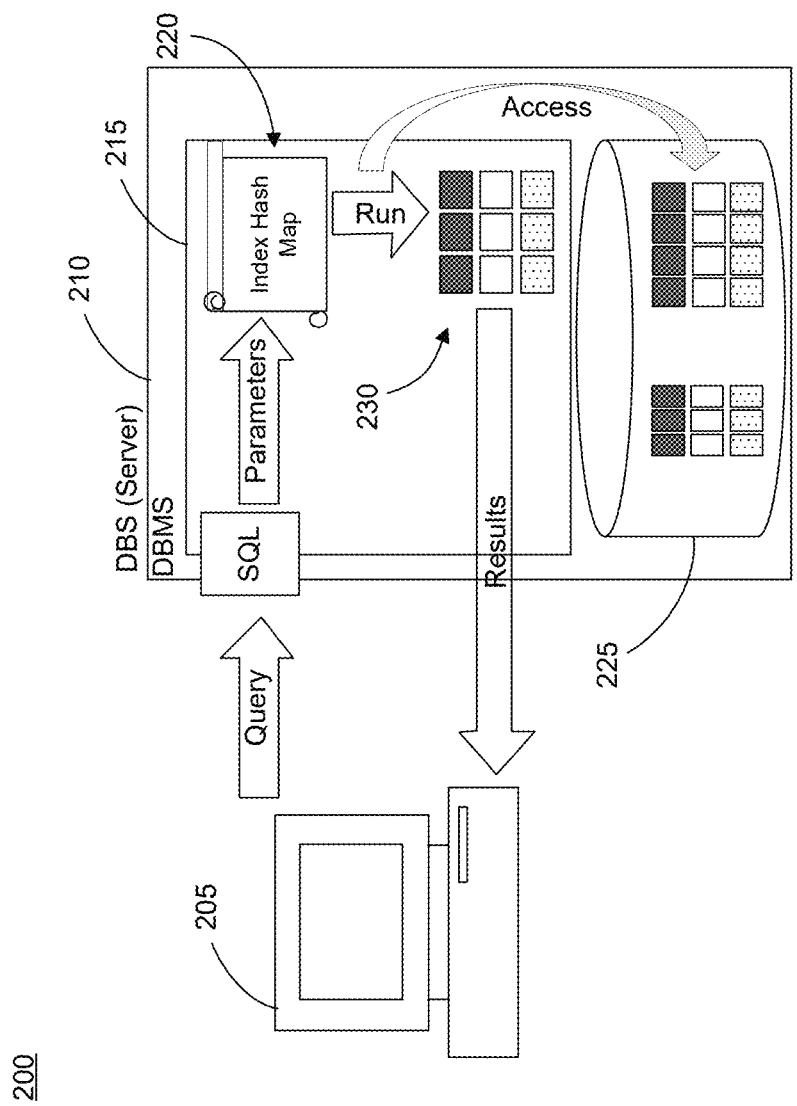
FIG. 2 provides an example of a computation environment for providing data aggregation based on hash map data structures, according to some embodiments of the disclosure.

FIG. 2 provides an example of a computation environment 200 for providing data aggregation based on hash map data structures, according to some embodiments of the disclosure. While computation environment 200 may be compatible with some embodiments of the data structures and the methods herein, the data structures and the methods herein are not limited to the example computation environment 200. Processes to store, retrieve, and perform operations on data may be facilitated by a database system (DBS) and a database warehouse (DWH).

As shown in FIG. 2, DBS 210 is a server. DBS 210 further includes a database management system (DBMS) 215. DBMS 215 may comprise software (e.g., programs, instructions, code, applications, services, etc.) that controls the organization of and access to database 225 that stores data. Database 225 may include an internal memory, an external memory, or other configurations of memory. Database 225 may be capable of storing large amounts of data, including relational data. The relational data may be stored in tables. In some embodiments, a plurality of clients, such as example client 205, may communicate with DBS 210 via a communication link (e.g., a network) and specified application programming interfaces (APIs). In some embodiments, the API language provided by DBS 210 is SQL, the Structured Query Language. Client 205 may communicate with DBS 115 using SQL to, for example, create and delete tables; insert, update, and delete data; and query data.

In general, a user may submit a query from client 205 in the form of a SQL query statement to DBS 210. DBMS 215 may execute the query by evaluating the parameters of the query statement and accessing database 225 as needed to produce a result 230. The result 230 may be provided to client 205 for storage and/or presentation to the user.

One type of query is a data aggregation query. The data aggregation query may operate to combine the values of fields in common from an input table. In general with reference to FIG. 2, some embodiments herein may include client 205 wanting to aggregate the data of tables stored in database 225 (e.g., a user at client 205 may desire to know the number of customers who bought a certain product). Client 205 may connect to DBS 210 and issue a SQL query statement that describes the data aggregation. DBMS 215 may create an executable instance of the data aggregation algorithm herein, provide it with the information needed to run the data aggregation algorithm (e.g., the name of tables to access and aggregate, etc.), and run the data aggregation operation or algorithm. In the process of running, the data aggregation algorithm herein may create an index hash map 220 to keep track of intermediate result data. An overall result comprising a result table may be computed based on the index hash map(s) containing the intermediate results. The overall result may be transmitted to client 205.

As an extension of FIG. 2, Database warehouses (DWHs) may be built on top of DBSs. Thus, a use-case of a DWH may be similar in some respects to DBS 210 of FIG. 2.

The computation environment of FIG. 2 may include a plurality of processors that can operate concurrently, in parallel and include a device or system similar to that described in FIG. 1. Additionally, the computation environment of FIG. 2 may have a memory that is shared amongst the plurality of processors, for example, like the system of FIG. 1. In order to fully capitalize on the parallel processing power of such a computation environment, the data structures used by the system may be designed, developed or adapted for being efficiently used in the parallel computing environment.

A hash table is a fundamental data structure in computer science that is used for mapping "keys" (e.g., the names of people) to the associated values of the keys (e.g., the phone number of the people) for fast data look-up. A conventional hash table stores key-value pairs. Conventional hash tables are designed to be altered only by a single processor. However, for parallel computation environments there exists a need for data structures particularly suitable for use in the parallel computing environment. In some embodiments herein, the data structure of an index hash map is provided. In some aspects, the index hash map provides a lock-free cache-efficient hash data structure developed to parallel computation environments with shared memory. In some embodiments, the index hash map may be adapted to column stores.

In a departure from conventional hash tables that store key-value pairs, the index hash map herein does not store key-value pairs. The index hash map herein generates key-index pairs by mapping each distinct key to a unique integer. In some embodiments, each time a new distinct key is inserted in the index hash map, the index hash map increments an internal counter and assigns the value of the counter to the key to produce a key-index pair. The counter may provide, at any time, the cardinality of an input set of keys that have thus far been inserted in the hash map. In some respects, the key-index mapping may be used to share a single hash map among different columns (or value arrays). For example, for processing a plurality of values distributed among different columns, the associated index for the key has to be calculated just once. The use of key-index pairs may facilitate bulk insertion in columnar storages. Inserting a set of key-index pairs may entail inserting the keys in a hash map to obtain a mapping vector containing indexes. This mapping vector may be used to build a value array per value column.

Figures 3A, 3B, 3C:
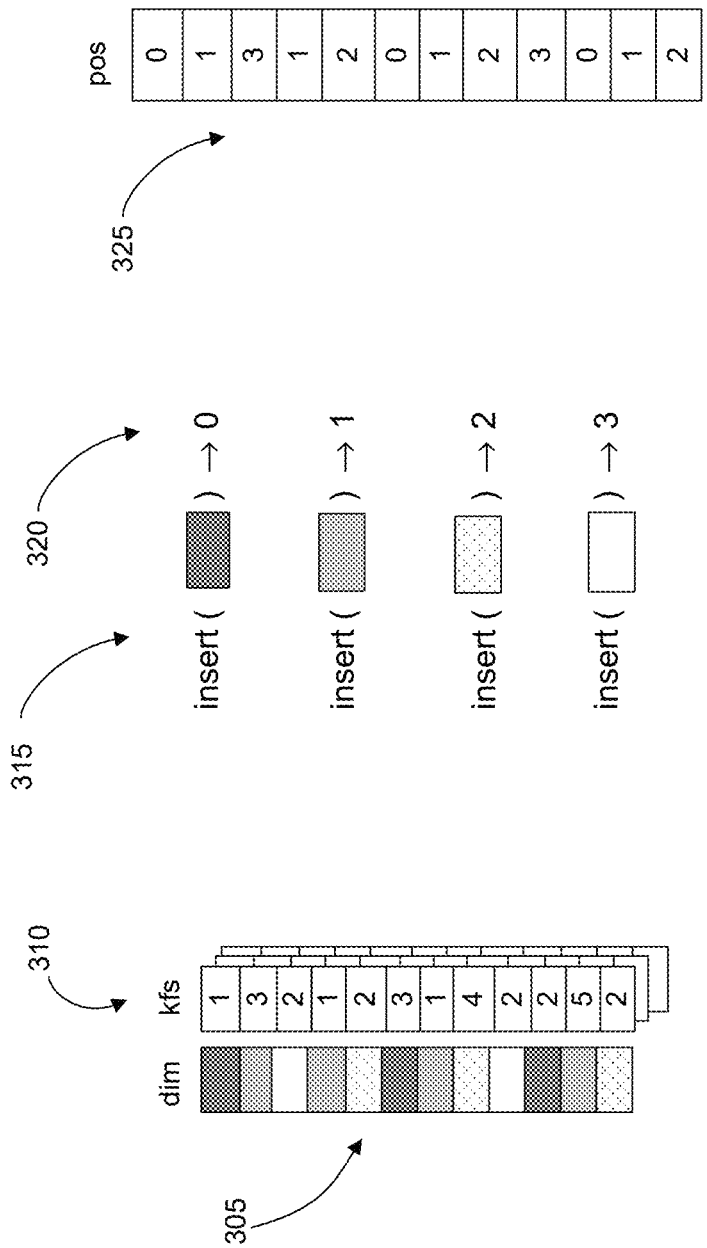
FIGS. 3A-3C are illustrative depictions of various aspects of an example data structure according to some embodiments.

FIGS. 3A-3C are illustrative depictions of various aspects of an example data structure according to some embodiments. The example data structure is provided for the purpose of illustration only and does not limit the disclosed embodiments. FIGS. 3A-3C may be described with regard to elements of FIGS. 1 and 2.

Referring to FIGS. 3A-3C, input data is illustrated in FIG. 3A including a key array 305. For each distinct key 315 from key array 305, the index hash map returns an index 320 (i.e., a unique integer), as seen in FIG. 3B. When all of the keys, from a column for example, have been inserted in the hash map, the mapping vector 325 of FIG. 3C results. To achieve a maximum parallel processor utilization, the index hash maps herein may be designed to avoid locking when being operated on by concurrently executing threads by producing wide data independence.

In some embodiments, index hash maps herein may be described by a framework defining a two-step process. In a first step, input data is split or separated into equal-sized blocks and the blocks are assigned to worker execution threads. These worker execution threads may produce intermediate results by building relatively small local hash tables or hash maps. The local hash maps are private to the respective thread that produces it. Accordingly, other threads may not see or access the local hash map produced by a given thread. In a second step, the local hash maps including the intermediate results may be merged to obtain a global result by concurrently executing merger threads. When accessing and processing the local hash maps, each of the merger threads may only consider a dedicated range of hash values. The merger threads may process hash-disjoint partitions of the local hash maps and produce disjoint result hash tables that may be concatenated to build an overall result. As hashing happens on the values, for a given value, e.g. "New York City", it will always be in the same hash range, or disjunctive partition within the hash maps. In this fashion, it is possible that individual threads run on their respective partition of data and produce a local portion of the final result without locking. Once all portions of the final result got created, one thread may in the end link these portions to form an overall result of the operation.

Figure 4:
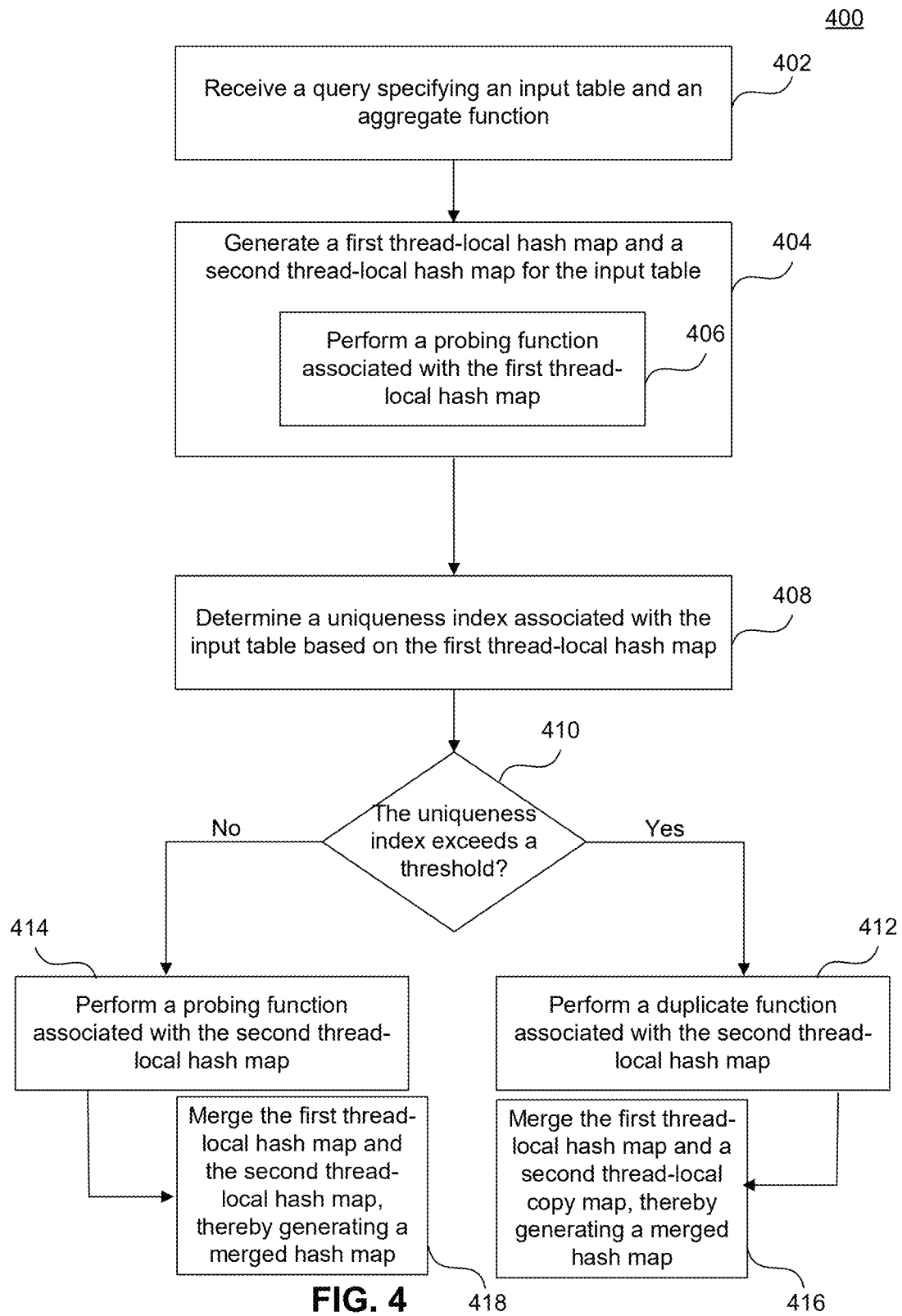
FIG. 4 illustrates an example method for providing data aggregation based on hash map data structures, according to some embodiments.

FIG. 4 illustrates an example method for providing data aggregation based on hash map data structures, according to some embodiments. As a convenience and not a limitation, FIG. 4 may be described with regard to elements of FIGS. 1, 2 and 3A-3C. Method 400 may represent the operation of a computing system (e.g., system 100 of FIG. 1 or DBS 210 of FIG. 2) for providing an efficient data aggregation based on hash map data structures. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

In step 402, a query specifying an input table and an aggregate function is received. DBS 210 can receive a query from a client to aggregate values in different rows in an input table. The input table can be separated or divided into a plurality of partitions. The size of the partitions may relate to or even be the size of a memory unit such as, for example, a cache associated with parallel processing units. In some examples, the partitions are equal in size.

In step 404, a first thread-local hash map and a second thread-local hash map for the input table are generated. The first thread-local hash map and a second thread-local hash map for the input table are generated can be generated to provide the intermediate results associated with the aggregate function. In some examples, the second thread-local hash map can be generated subsequent to the determination that the first thread-local hash map is full. The input table can be separated or divided into a first partition and a second partition. Each partition can be assigned to an execution thread. In some examples, a plurality of execution threads running in parallel may each generate a local hash table or hash map. Each of the first thread-local hash map and the second thread-local hash map is private to the one of the plurality of threads that generated the local hash map. In some examples, the local hash maps providing the intermediate results may be of a fixed size. In some examples, the first thread-local hash map can correspond to data in the first partition of the input table. Similarly, the second thread-local hash map can correspond to data in the second partition of the input table.

The first thread-local hash map and the second thread-local hash map can include key-index pairs. Hash values for columns of the input table can be calculated by a plurality of concurrently executing execution threads. The calculated hash values in the first thread-local hash map and the second thread-local hash map for the input table can be stored as key-index pairs. Each key of the key-index pairs that is distinct can be mapped to a unique integer. In some examples, the key of the key-index pairs can be extracted from the partitions of the input table. The index of the key-index pairs can include one of the unique integers. In some examples, a row number of the input table corresponding to an associated value stored for each of the key-index pairs can be stored.

When inserting values into the first thread-local hash map, in step 406, a probing function is performed associated with the first thread-local hash map. As described above, the first thread-local hash map can correspond to data in the first partition of the input table. In some examples, the probing function can include probe sequences such as linear probing or quadratic probing, and/or the like. The probing function can be performed to aggregate values in different rows in the first partition of the input table.

In step 408, subsequent to the performing the probing function, an index cardinality associated with the input table is determined based on the first thread-local hash map. The index cardinality can include the ratio of distinct values to the total number of rows. In some examples, the index cardinality can include an estimation of cardinality of the input set of keys that have thus far been inserted in the first thread-local hash map. The index cardinality can include an estimation of cardinality of data between different rows in the input table. In some examples, the index cardinality can be associated with the uniqueness and distribution of values within an index in a data table. Higher index cardinality can represent more unique or uncommon values within the index key. In some examples, data tables with high index cardinality are more selective, aiding in efficient data retrieval by narrowing down results quickly. Conversely, data tables with low cardinality may lead to inefficient queries as they yield a larger subset of data.

In step 410, determining whether the index cardinality exceeds a threshold. In some examples, the threshold can be approximately 0.6.

If the index cardinality is determined to exceed the threshold, the method 400 goes to 412. In step 412, a duplicate function associated with the second thread-local hash map is performed. In some examples, a probing function associated with the second thread-local hash map can be refrained from performing. As described above, the second thread-local hash map can correspond to data in the second partition of the input table. In some examples, data in the second partition of the input table can be duplicated and inserted to a second thread-local copy map. The second thread-local copy map is generated with hashing to determine the partition of data. By just duplicating the data, and by omitting the probing, the second thread-local copy map can be filled quicker.

In step 416, the first thread-local hash map and the second thread-local copy map are merged, thereby generating a merged hash map. In some examples, when generating the merged hash map, a probing function can be performed. The probing function can include probe sequences such as linear probing or quadratic probing, and/or the like. The probing function can be performed to aggregate values in different rows in the first thread-local hash map and the second thread-local copy map. Alternatively, the merged hash map can store a plurality of pointers. Each pointer can be associated with a memory address to access an entry in the first thread-local hash map and the second thread-local copy map. In some embodiments, the merged hash map may not be constructed by copying all values to their final positions in the columns. Instead, the merged hash map may be a virtual table. The virtual table may hold references to the original columns and have a vector of all rows that match each other. Upon access to a row, a call to do so may be routed transparently to the respective row of the original column. A benefit of the virtual result is that it is not necessary to copy the data.

If the index cardinality is determined not to exceed the threshold, the method 400 goes to 414.

In step 414, a probing function is performed associated with the second thread-local hash map. As described above, the second thread-local hash map can correspond to data in the second partition of the input table. In some examples, the probing function can include probe sequences such as linear probing or quadratic probing, and/or the like. The probing function can be performed to aggregate values in different rows in the second partition of the input table.

In step 418, the first thread-local hash map and the second thread-local hash map are merged, thereby generating a merged hash map. In some examples, when generating the merged hash map, a probing function can be performed. The probing function can include probe sequences such as linear probing or quadratic probing, and/or the like. The probing function can be performed to aggregate values in different rows in the first thread-local hash map and the second thread-local hash map. Alternatively, the merged hash map can store a plurality of pointers. Each pointer can be associated with a memory address to access an entry in the first thread-local hash map and the second thread-local hash map. In some embodiments, the merged hash map may not be constructed by copying all values to their final positions in the columns. Instead, the merged hash map may be a virtual table. The virtual table may hold references to the original columns and have a vector of all rows that match each other. Upon access to a row, a call to do so may be routed transparently to the respective row of the original column. A benefit of the virtual result is that it is not necessary to copy the data.

In some examples, the merging of the local hash maps may produce a set of disjoint result hash tables or hash maps. In some embodiments, when accessing and processing the local hash maps, each of the merger threads may only consider a dedicated range of hash values. From a logical perspective, the local hash maps may be considered as being partitioned by their hash value. One implementation may use, for example, some first bits of the hash value to form a range of hash values. The same ranges are used for all local hash maps, thus the "partitions" of the local hash maps are disjunctive. As an example, if a value "a" is in range 5 of a local hash map, then the value will be in the same range of other local hash maps. In this manner, all identical values of all local hash maps may be merged into a single result hash map. Since the "partitions" are disjunctive, the merged result hash maps may be created without a need for locks. Additionally, further processing on the merged result hash maps may be performed without locks since any execution threads will be operating on disjunctive data.

In some embodiments, the local (index) hash maps providing the intermediate results may be of a fixed size. Instead of resizing a local hash map, the corresponding worker execution thread may replace its local hash map with a new hash map when a certain load factor is reached and place the current local hash map into a buffer containing hash maps that are ready to be merged. In some embodiments, the size of the local hash maps may be sized such that the local hash maps fit in a cache (e.g., L2 or L3). The specific size of the cache may depend on the sizes of caches in a given CPU architecture. In some embodiments, the index hash map framework discussed above may provide an infrastructure to implement parallelized query processing algorithms or operations.

Figure 5:
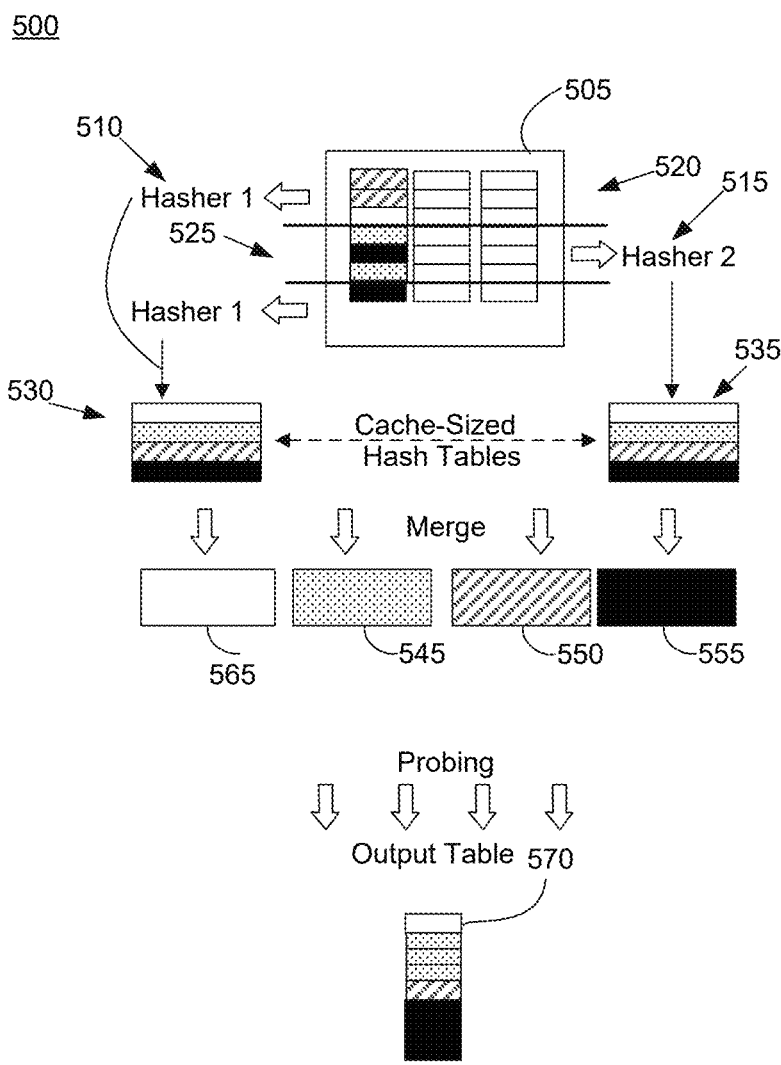
FIG. 5 illustrates an example parallel processing flow based on hash map data structures, according to some embodiments.

FIG. 5 illustrates an example parallel processing flow based on hash map data structures, according to some embodiments. As a convenience and not a limitation, FIG. 5 may be described with regard to elements of FIGS. 1, 2, 3A-3C and 4. The example system 500 is provided for the purpose of illustration only and does not limit the disclosed embodiments.

In FIG. 5, an input table 505 is hashed using the index hash table framework. As an initial step, multiple concurrently running execution threads calculate hash values for the columns of the input table 505. These hash values are inserted into thread-local hash maps, in accordance with the index hash table framework discussed above. One set of thread-local hash maps are produced for the input table 505. As illustrated in FIG. 5, the input table 505 is divided into partitions, such as, partitions 520 and 525, and a plurality of execution threads 510, 515 operate to produce disjoint local thread hash maps 530, 535. In addition to providing key-index pairs, the thread local hash maps also include the row number or row identifier of the original column corresponding to the value referenced by each hash map entry.

Proceeding with the operation in FIG. 5, the thread local hash maps 530, 535 are merged into one hash map per partition. This aspect may be accomplished in some embodiments by one thread per core operating to merge all partitions that belong to each other into a single hash map.

Merged hash tables for the input table 505 are depicted at 545, 550, 555 and 565. The merging of the thread local hash maps of input table 505 may be accomplished by a plurality of execution threads operating in parallel.

Figure 6A:
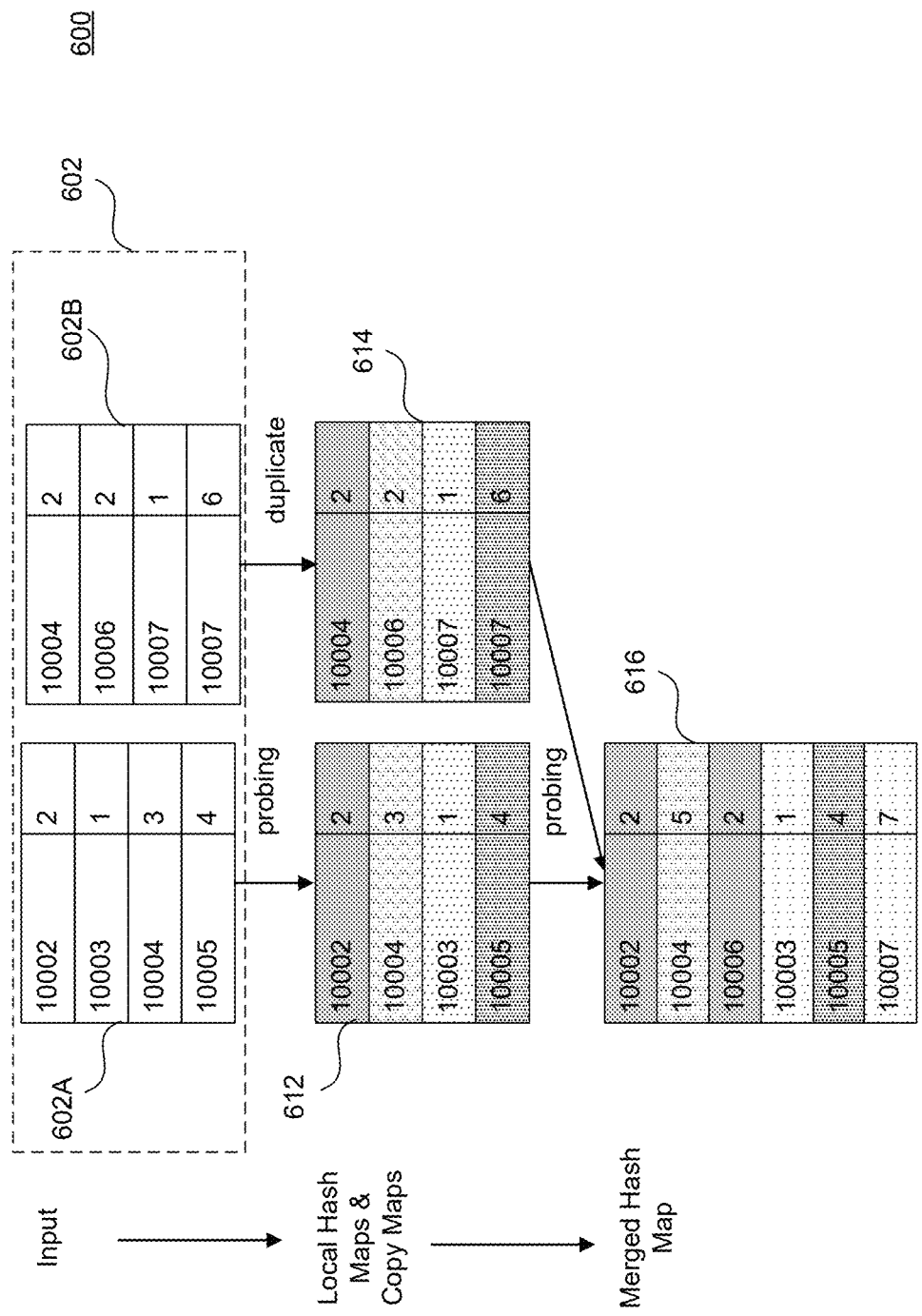
FIG. 6A illustrates a first example block diagram of data aggregation based on hash map data structures, according to some embodiments.

FIG. 6A illustrates a first example block diagram of data aggregation based on hash map data structures, according to some embodiments. As a convenience and not a limitation, FIG. 6A may be described with regard to elements of FIGS. 1, 2, 3A-3C, 4 and 5. The first example block diagram 600 is provided for the purpose of illustration only and does not limit the disclosed embodiments.

In FIG. 6A, an input table 602 is hashed using the index hash table framework. Input table 602 can include two columns. The left column can include an identifier "1002", "1003", "1004" and "1005" to each identify a different geolocation which a specific model of a cell phone was sold. For example, "1002" can be associated with "Cologne" and "1003" can be associated with "Berlin". The right column can include a value corresponding to the identifier on the left column. For example, the right column can include a number of the specific model of a cell phone sold at a geolocation associated with the left column. In some examples, the data aggregation can be performed to aggregate a total number of the specific models of a cell phone sold at each geolocation in input table 602.

The input table 602 can include a first portion 602A and a second portion 602B. In some examples, data in first portion 602A and second portion 602B may be associated with different sources like different partitions or memory locations that holds the data. Alternatively or in addition, data in first portion 602A and second portion 602B may be associated with a previous operation. In some examples, the previous operation may include a data partitioning.

As an initial step, multiple concurrently running execution threads calculate hash values for the columns of the input table 602. These hash values are inserted into thread-local hash maps, in accordance with the index hash table framework discussed in FIG. 5. A first thread-local hash map 612 and a second thread-local copy map 614 are produced for the input table 602.

In some examples, a probing function, such as linear probing, can be performed associated with the first thread-local hash map 612. Data in the first thread-local hash map 612 can be aggregated. Subsequent to the performing the probing function, an index cardinality can be determined based on the first thread-local hash map. In some examples, the index cardinality can include an estimation of cardinality of data between different rows in first portion 602A. In some examples, the size of the first thread-local hash map 612 can be checked to calculate how many entries are added, and then their values. Then, the index cardinality can be determined based on the size of the first thread-local hash map 612. For example, a high index cardinality shown in FIG. 6A can be determined based on no condensing in size of the first thread-local hash map 612.

Then, the index cardinality can be determined to exceed a threshold. The threshold can be approximately 0.6. In some examples, the index cardinality for input table input table 602 can include a first number of first entries in the first thread-local hash map divided by a second number of second entries in the input table. The second entries can be associated with the first thread-local hash map. As shown in FIG. 6A, the index cardinality can be determined to be one.

In response to the determination that the index cardinality exceeds the threshold, a duplicate function can be performed associated with the second thread-local copy map 614. In some examples, data in second portion 602B can be duplicated to the second thread-local copy map 614. Hyper Log Log statistics can be calculated for cardinality estimation of distinct keys in the second thread-local copy map 614.

Proceeding with the operation in FIG. 6A, the first thread-local hash map 612 and the second thread-local copy map 614 are merged into one hash map 616. In some examples, a probing function, such as linear probing, can be performed associated with the first thread-local hash map 612 and the second thread-local copy map 614. In some examples, hash map 616 can include an aggregated total number of the specific model of cell phones sold at each geolocation in input table 602.

Figure 6B:
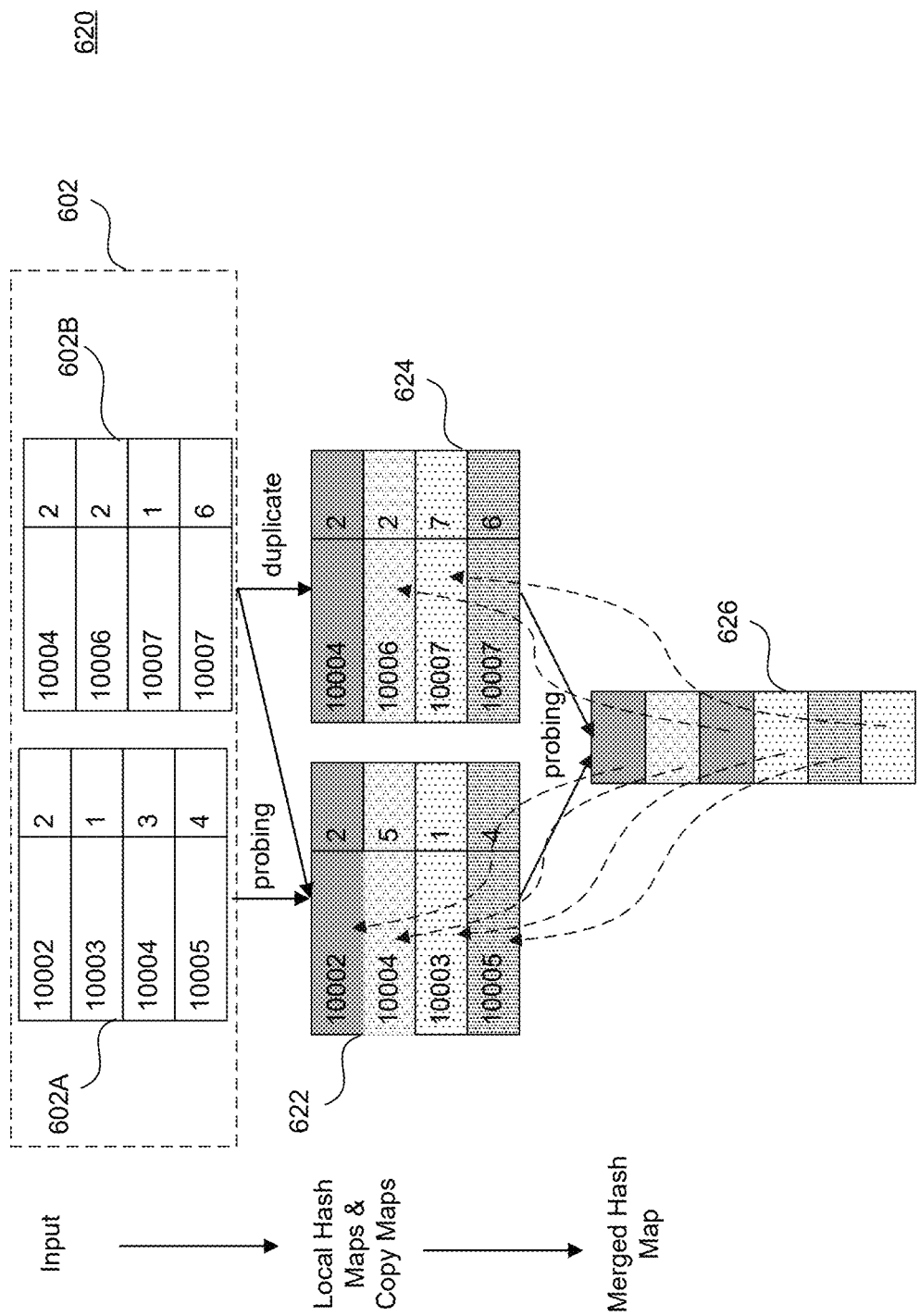
FIG. 6B illustrates a second example block diagram of data aggregation based on hash map data structures, according to some embodiments.

FIG. 6B illustrates a second example block diagram of data aggregation based on hash map data structures, according to some embodiments. As a convenience and not a limitation, FIG. 6B may be described with regard to elements of FIGS. 1, 2, 3A-3C, 4 and 5. The second example block diagram 620 is provided for the purpose of illustration only and does not limit the disclosed embodiments.

In FIG. 6B, an input table 602 is hashed using the index hash table framework. Input table 602 can include two columns. The left column can include an identifier "1002", "1003", "1004" and "1005" to each identify a different geolocation which a specific model of cell phone was sold. For example, "1002" can be associated with "Cologne" and "1003" can be associated with "Berlin". The right column can include a value corresponding to the identifier on the left column. For example, the right column can include a number of the specific model of cell phone sold at a geolocation associated with the left column. In some examples, the data aggregation can be performed aggregate a total number of the specific model of cell phone sold at each geolocation in input table 602.

The input table 602 can include a first portion 602A and a second portion 602B. In some examples, data in first portion 602A and second portion 602B may be associated with different sources like different partitions or memory locations that holds the data. Alternatively or in addition, data in first portion 602A and second portion 602B may be associated with a previous operation. In some examples, the previous operation may include a data partitioning.

As an initial step, multiple concurrently running execution threads calculate hash values for the columns of the input table 602. These hash values are inserted into thread-local hash maps, in accordance with the index hash table framework discussed in FIG. 5. A first thread-local hash map 622 and a second thread-local copy map 624 are produced for the input table 602.

In some examples, a probing function, such as linear probing, can be performed associated with the first thread-local hash map 622. Subsequent to the performing the probing function, an index cardinality can be determined based on the first thread-local hash map 622. In some examples, the index cardinality can include an estimation of cardinality of data between different rows in first portion 602A. In some examples, the size of the first thread-local hash map 622 can be checked to calculate how many entries are added, and then their values. Then, the index cardinality can be determined based on the size of the first thread-local hash map 622. For example, a high index cardinality shown in FIG. 6B can be determined based on no condensing in size of the first thread-local hash map 622.

Then, the index cardinality can be determined to exceed a threshold. The threshold can be approximately 0.6. In some examples, the index cardinality for input table input table 602 can include a first number of first entries in the first thread-local hash map divided by a second number of second entries in the input table. The second entries can be associated with the first thread-local hash map.

In response to the determination that the index cardinality exceeds the threshold, a duplicate function can be performed associated with the second thread-local copy map 624. In some examples, data in second portion 602B can be duplicated to the second thread-local copy map 624. Hyper Log Log statistics can be calculated for cardinality estimation of distinct keys in the second thread-local copy map 624.

Proceeding with the operation in FIG. 6B, the first thread-local hash map 622 and the second thread-local copy map 624 are merged into one hash map 626. In some examples, a probing function, such as linear probing, can be performed associated with the first thread-local hash map 622 and the second thread-local copy map 624. As shown in FIG. 6B, hash map 626 can store pointers, such as memory addresses, to entries in the first thread-local hash map 622 and the second thread-local copy map 624. In some examples, data aggregate can be adjusted directly within the first thread-local hash map 622 and the second thread-local copy map 624. In some examples, hash map 626 can be associated with an aggregated total number of the specific model of cell phones sold at each geolocation in input table 602.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for providing data aggregation based on hash map data structures, comprising:
   receiving a query specifying an input table and an aggregate function;
   generating a first thread-local hash map and a second thread-local hash map for the input table, comprising:
      calculating, by a plurality of concurrently executing execution threads, hash values for columns of the input table; and
      storing the calculated hash values in the first thread-local hash map and the second thread-local hash map for the input table as key-index pairs where each key of the key-index pairs that is distinct is mapped to a unique integer, the key of the key-index pairs being extracted from partitions of the input table and an index of the key-index pairs comprising one of the unique integers, the storing including storing a row number of the input table corresponding to an associated value stored for each of the key-index pairs;
   subsequent to the generating the first thread-local hash map, determining, based on the first thread-local hash map, an index cardinality associated with the input table;
   determining whether the index cardinality exceeds a threshold;
   in response to the determination that the index cardinality exceeds the threshold, performing a duplicate function associated with the second thread-local hash map;
   generating a second thread-local copy map based on the performing the duplicate function; and
   subsequent to the generating the second thread-local copy map, merging the first thread-local hash map and the second thread-local copy map, thereby generating a merged hash map.

2. The computer-implemented method of claim 1, further comprising:
   in response to the determination that the index cardinality does not exceed the threshold, performing a second probing function associated with the second thread-local hash map; and
   subsequent to the performing the second probing function, merging the first thread-local hash map and the second thread-local hash map, thereby generating the merged hash map.

3. The computer-implemented method of claim 1, the index cardinality for the input table comprises: a first number of first entries in the first thread-local hash map divided by a second number of second entries in the input table, wherein the second entries are associated with the first thread-local hash map.

4. The computer-implemented method of claim 1, wherein the performing the duplicate function associated with the second thread-local hash map comprises: refraining from performing a probing function associated with the second thread-local hash map.

5. The computer-implemented method of claim 1, wherein the merging the first thread-local hash map and the second thread-local copy map comprises:
   storing a plurality of pointers in the merged hash map, wherein each pointer is associated with the first thread-local hash map and the second thread-local copy map.

6. The computer-implemented method of claim 1, wherein the generating the first thread-local hash map and the second thread-local hash map comprises:
   separating the input table into disjoint partitions;
   assigning each partition to an execution thread; and
   generating the first thread-local hash map and the second thread-local hash map including key-index pairs.

7. A computing system for providing data aggregation based on hash map data structures, comprising:
   one or more memories; and
   at least one processor each coupled to at least one of the memories and configured to perform operations comprising:
   receiving a query specifying an input table and an aggregate function;
   generating a first thread-local hash map and a second thread-local hash map for the input table, comprising:
   calculating, by a plurality of concurrently executing execution threads, hash values for columns of the input table; and
   storing the calculated hash values in the first thread-local hash map and the second thread-local hash map for the input table as key-index pairs where each key of the key-index pairs that is distinct is mapped to a unique integer, the key of the key-index pairs being extracted from partitions of the input table and an index of the key-index pairs comprising one of the unique integers, the storing including storing a row number of the input table corresponding to an associated value stored for each of the key-index pairs;
   subsequent to the generating the first thread-local hash map, determining, based on the first thread-local hash map, an index cardinality associated with the input table;
   determining whether the index cardinality exceeds a threshold;
   in response to the determination that the index cardinality exceeds the threshold, performing a duplicate function associated with the second thread-local hash map;
   generating a second thread-local copy map based on the performing the duplicate function; and
   subsequent to the generating the second thread-local copy map, merging the first thread-local hash map and the second thread-local copy map, thereby generating a merged hash map.

8. The computing system of claim 7, the operations further comprising:
   in response to the determination that the index cardinality does not exceed the threshold, performing a second probing function associated with the second thread-local hash map; and
   subsequent to the performing the second probing function, merging the first thread-local hash map and the second thread-local hash map, thereby generating the merged hash map.

9. The computing system of claim 7, wherein the index cardinality for the input table comprises: a first number of first entries in the first thread-local hash map divided by a second number of second entries in the input table, wherein the second entries are associated with the first thread-local hash map.

10. The computing system of claim 7, wherein the operation of performing the duplicate function associated with the second thread-local hash map comprises: refraining from performing a probing function associated with the second thread-local hash map.

11. The computing system of claim 7, wherein the operation of the merging the first thread-local hash map and the second thread-local copy map comprises:
   storing a plurality of pointers in the merged hash map, wherein each pointer is associated with the first thread-local hash map and the second thread-local copy map.

12. The computing system of claim 7, wherein the operation of generating the first thread-local hash map and the second thread-local hash map comprises:
   separating the input table into disjoint partitions;
   assigning each partition to an execution thread; and
   generating the first thread-local hash map and the second thread-local hash map including key-index pairs.

13. A non-transitory computer-readable medium having instructions stored thereon that, when executed by at least one computing device, cause the
   at least one computing device to perform operations comprising:
   receiving a query specifying an input table and an aggregate function;
   generating a first thread-local hash map and a second thread-local hash map for the input table, comprising:
   calculating, by a plurality of concurrently executing execution threads, hash values for columns of the input table; and
   storing the calculated hash values in the first thread-local hash map and the second thread-local hash map for the input table as key-index pairs where each key of the key-index pairs that is distinct is mapped to a unique integer, the key of the key-index pairs being extracted from partitions of the input table and an index of the key-index pairs comprising one of the unique integers, the storing including storing a row number of the input table corresponding to an associated value stored for each of the key-index pairs;
   subsequent to the generating the first thread-local hash map, determining, based on the first thread-local hash map, an index cardinality associated with the input table;
   determining whether the index cardinality exceeds a threshold;
   in response to the determination that the index cardinality exceeds the threshold, performing a duplicate function associated with the second thread-local hash map;
   generating a second thread-local copy map based on the performing the duplicate function; and
   subsequent to the generating the second thread-local copy map, merging the first thread-local hash map and the second thread-local copy map, thereby generating a merged hash map.

14. The non-transitory computer-readable medium of claim 13, the operations further comprising:
   in response to the determination that the index cardinality does not exceed the threshold, performing a second probing function associated with the second thread-local hash map; and
   subsequent to the performing the second probing function, merging the first thread-local hash map and the second thread-local hash map, thereby generating the merged hash map.

15. The non-transitory computer-readable medium of claim 13, wherein the index cardinality for the input table comprises: a first number of first entries in the first thread-local hash map divided by a second number of second entries in the input table, wherein the second entries are associated with the first thread-local hash map.

16. The non-transitory computer-readable medium of claim 13, wherein the operation of performing the duplicate function associated with the second thread-local hash map comprises: refraining from performing a probing function associated with the second thread-local hash map.

17. The non-transitory computer-readable medium of claim 13, wherein the operation of the merging the first thread-local hash map and the second thread-local copy map comprises:
   storing a plurality of pointers in the merged hash map, wherein each pointer is associated with the first thread-local hash map and the second thread-local copy map.

18. The non-transitory computer-readable medium of claim 13, wherein the operation of generating the first thread-local hash map and the second thread-local hash map comprises:
   separating the input table into disjoint partitions;
   assigning each partition to an execution thread; and
   generating the first thread-local hash map and the second thread-local hash map including key-index pairs.

* * * * *